United States Patent [19]

Hayama et al.

[11] Patent Number: 4,494,506
[45] Date of Patent: Jan. 22, 1985

[54] INTAKE SYSTEM FOR AN INTERNAL COMBUSTION ENGINE

[75] Inventors: Nobuhiro Hayama; Masasige Kinjyo; Haruo Okimoto; Ikuo Matsuda, all of Hiroshima, Japan

[73] Assignee: Mazda Motor Corporation, Hiroshima, Japan

[21] Appl. No.: 463,044

[22] Filed: Feb. 1, 1983

[30] Foreign Application Priority Data

| Feb. 3, 1982 | [JP] | Japan | 57-16556 |
| Feb. 3, 1982 | [JP] | Japan | 57-16557 |
| Feb. 3, 1982 | [JP] | Japan | 57-16558 |
| Feb. 3, 1982 | [JP] | Japan | 57-16559 |
| Apr. 26, 1982 | [JP] | Japan | 57-70027 |
| Apr. 27, 1982 | [JP] | Japan | 57-70968 |

[51] Int. Cl.$^3$ .............................................. F02D 13/02
[52] U.S. Cl. .................................... 123/348; 123/322; 123/90.18
[58] Field of Search ............... 123/347, 348, 321, 322, 123/332, 333, 334, 90.15–90.18

[56] References Cited

U.S. PATENT DOCUMENTS

| 3,416,502 | 12/1968 | Weiss | 123/348 |
| 3,548,798 | 12/1970 | Fleischer | 123/348 |
| 3,919,986 | 11/1975 | Goto | 123/316 |
| 4,232,641 | 11/1980 | Curtil | 123/316 |

FOREIGN PATENT DOCUMENTS 52-139819 11/1977 Japan.
55-69715 5/1980 Japan.

Primary Examiner—William A. Cuchlinski, Jr.
Attorney, Agent, or Firm—Fleit, Jacobson, Cohn & Price

[57]      ABSTRACT

An internal combustion engine including a combustion chamber, an intake system having an intake valve and an intake passage leading through the intake valve to the combustion chamber for providing a supply of intake gas to the combustion chamber. A valve timing control device is provided for governing opening and closing timings of the intake valve so that the intake valve is closed at a controlled timing in the compression stroke, whereby a controlled amount of the intake gas is returned from the combustion chamber to the intake passage in the compression stroke to thereby control the effective charge to the combustion chamber. A detecting device is provided for detecting at least one factor which is related to engine speed and producing an engine speed signal, and a manually operated reference setting device for determining a reference value together with, an engine overrun preventing device for comparing the engine speed signal with the reference value and retarding the closing timing of the intake valve to thereby decrease the effective charge when the engine speed signal is greater than the reference value.

9 Claims, 10 Drawing Figures

INTAKE SYSTEM FOR AN INTERNAL COMBUSTION ENGINE

The present invention relates to an internal combustion engine, and more particularly to an intake system for internal combustion engines. More specifically, the present invention pertains to an engine intake system in which the amount of intake charge in a combustion chamber is determined by displacing a controlled amount of intake gas out of the combustion chamber.

In an internal combustion engine of the Otto cycle type, it has been recognized that the thermal energy as produced in the combustion chambers cannot be transferred into a brake output with a satisfactorily high efficiency, but a substantial part of such thermal energy is lost in the form of thermal and mechanical losses. These losses are considered as being serious obstacles against efforts in improving fuel economy of the engine. The mechanical losses include pumping losses which are produced in the intake and exhaust strokes of the engine operations. Such pumping losses of an engine are more significant in light load engine operations than in heavy load operations.

It has been recognized that a more improved fuel economy is obtained with an engine of a smaller displacement than with an engine of a larger displacement as compared on the basis of the size of the car body. It is understood that one of the reasons for such improvement in fuel economy is that the engine is operated under a relatively high load so that the pumping losses can be decreased. Therefore, it will be possible to decrease the pumping losses and therefore to improve the fuel economy without sacrificing the engine full power output if the engine can be operated under a light load operation as if it had a smaller displacement. In other words, the pumping losses under a lightload operation can be decreased by eliminating or at least decreasing the losses at the throttle valve in the intake stroke and the losses in the compression stroke. For the purpose, Japanese patent application No. 53-143947, which was filed on Nov. 21, 1978 and disclosed for public inspection on May 26, 1980 under the disclosure number 55-69715, teaches to control the engine intake valve so that its closing timing is substantially retarded under a light load operation to thereby allow a part of the intake gas to flow back into the intake passage in the compression stroke. With this arrangement, it is possible to introduce an excess amount of intake gas into the combustion chamber to thereby decrease the losses at the throttle valve. Further, in Japanese patent application No. 51-56217, which was filed on May 17, 1976 and disclosed for public inspection on Nov. 22, 1977 under the disclosure number 52-139819, there is disclosed an engine having an auxiliary intake passage leading through an auxiliary intake valve to the combustion chamber. In the engine disclosed by the Japanese patent application, the auxiliary intake valve is normally closed and is operated only under a light load engine operation so as to be closed later than the main intake valve to thereby allow a part of the intake gas in the combustion chamber to flow back into the auxiliary intake passage in the compression stroke.

However, it has been experienced in the engines as proposed by the Japanese patent applications that the flow resistance at the auxiliary intake valve is increased as the engine speed increases with the result that sufficient amount of intake gas cannot be returned to the auxiliary intake passage from the combustion chamber. This will cause an increase in the effective charge and the engine speed becomes out of control producing an overrun phenomenon.

It is therefore an object of the present invention to provide in an engine having an intake system of a type in which a part of the intake gas is returned to the intake passage in the compression stroke, a decrease in the pumping losses under a light load engine operation without having the danger of overrun.

Another object of the present invention is to provide an internal combustion engine in which pumping loss can be substantially decreased.

The above and other objects of the present invention can be accomplished by an internal combustion engine including combustion chamber means in which intake and compression strokes are carried out, an intake system having intake passage means for providing a supply of intake gas to said combustion chamber means, charge control means for returning a controlled amount of the intake gas in the combustion chamber means to said intake passage means in the compression stroke to thereby control effective charge to the combustion chamber means, detecting means for detecting at least one factor which is related to engine speed and producing an engine speed signal, manually operated reference setting means for determining a reference value, engine output restricting means for comparing the engine speed signal with said reference value and restricting engine output when said engine speed signal is greater than said reference value. The engine output restricting means may include means for decreasing the amount of fuel supply or increasing the amount of exhaust gas which is to be recirculated to the intake system. Alternatively, the intake passage means may be provided with intake gas flow restricting valve means which is operated as necessary to restrict the amount of intake gas drawn to the combustion chamber means in the intake stroke. In a further alternative arrangement, means may be provided for increasing the amount of intake gas returned to the intake passage means when the engine speed signal is greater than the reference value. The engine output may also be restricted by retarding the ignition timing. The detecting means may be in the form of an airflow sensor which detects the amount of intake air flow or an engine speed sensor which detects the engine speed.

The above and other objects and features of the present invention will become apparent from the following descriptions of preferred embodiments making reference to the accompanying drawings, in which.

Figure 1:
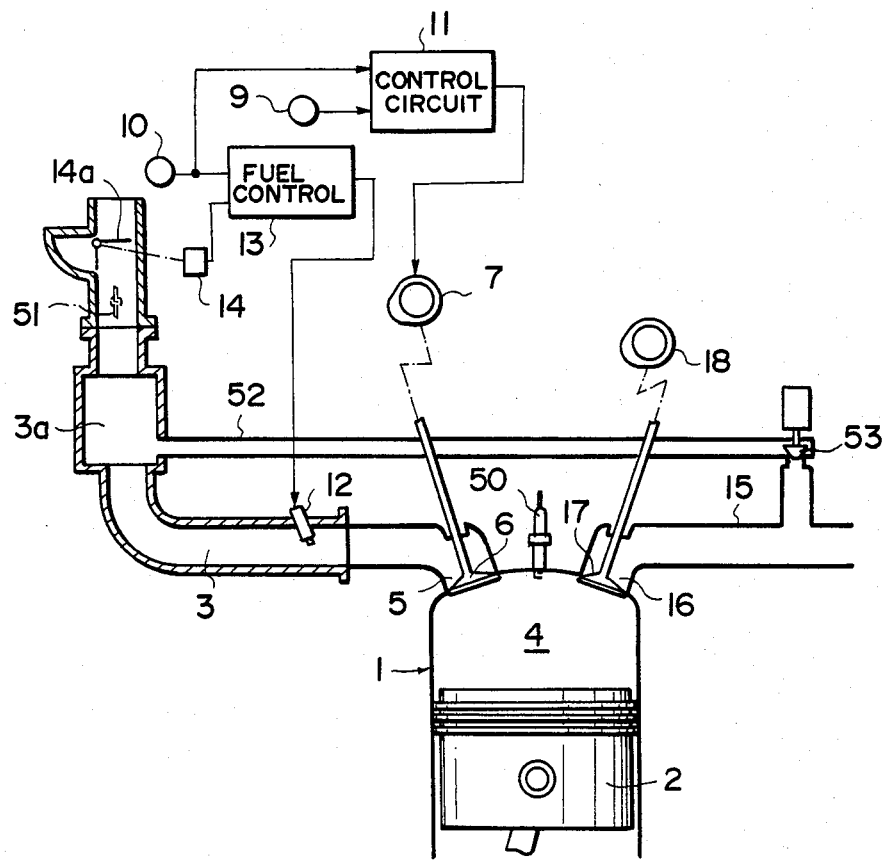
FIG. 1 is a diagrammatical illustration of an engine having an intake system in accordance with one embodiment of the present invention.

Referring to the drawings, particularly to FIG. 1, the engine shown therein includes a cylinder 1 in which a piston 2 is disposed for reciprocating movement. In the cylinder 1, there is defined a combustion chamber 4 by the piston 2 as in conventional engines. An intake passage 3 is communicated through an intake port 5 with the combustion chamber 4 and an intake valve 6 is provided for cooperation with the intake port 5. The cylinder 1 is also formed with an exhaust port 16 which is connected with an exhaust passage 15 and associated with an exhaust valve 17. The engine 1 further has an ignition plug 50 which is mounted on the cylinder head. Between the intake passage 3 and the exhaust passage 15, there is provided an exhaust gas recirculation passage 52 which has a recirculation control valve 53 and is adapted to return a part of exhaust gas from the exhaust passage 15 to the enlarged chamber 3a of the intake passage 3.

The intake passage 3 is provided with an airflow sensing element 14a associated with an airflow sensor 14 for detecting the amount of air flow through the intake passage 3. Downstream of the airflow sensing element 14a, the intake passage 3 is formed with an enlarged chamber 3a and a fuel injecting nozzle 12 is disposed in the intake passage 3 downstream of the enlarged chamber 3a for injecting fuel to the intake passage 3 to form an air-fuel mixture. The engine also has an engine speed detector 10 which produces an engine speed signal. The engine speed signal from the engine speed detector 10 and the airflow signal from the sensor 14 are applied to a fuel injection control circuit 13 which determines the amount of fuel to be supplied to the engine in accordance with the engine speed and the airflow to the engine. The full control circuit 13 thus produces a pulsating signal which is applied to the fuel injector 12 to actuate the same.

Figure 2:
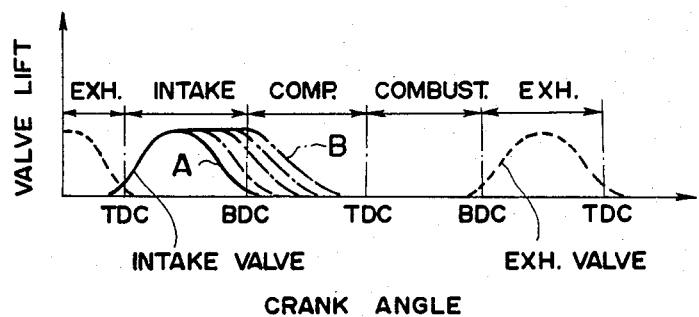
FIG. 2 is a diagram showing the intake valve timing control in the engine shown in FIG. 1.
Figure 3:
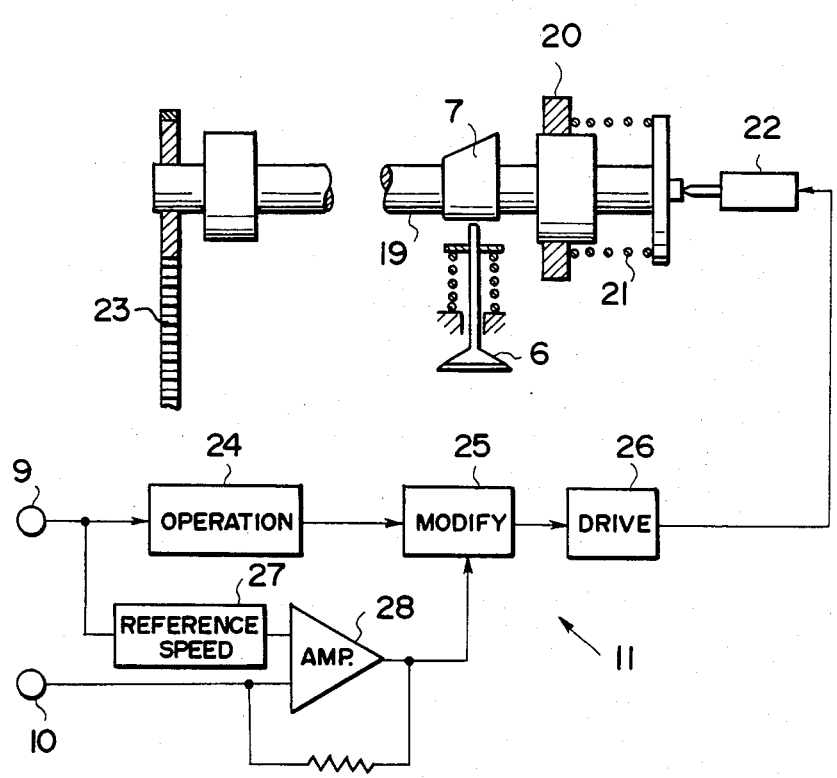
FIG. 3 is a diagrammatical illustration of in intake valve timing control system.

The intake valve 6 is actuated by a timing cam 7 whereas the exhaust valve 17 is actuated by a timing cam 18. Referring to FIG. 3, it will be noted that the timing cam 7 is formed on a cam shaft 19 which is rotatably and axially slidably supported by a stationary support 20 of the engine and adapted to be rotated through a timing belt 23 by the engine crankshaft (not shown). As shown in FIG. 3, the timing cam 7 has an axially tapered profile so that the timing of the intake valve 6 can be determined by the axial position of the cam 7. FIG. 2 shows the timing of the intake valve 6 and it will be understood that the valve opening timing is unchanged even when the timing cam 7 is axially shifted but the valve closing timing is changed between the curves A and B. The engine shown in FIG. 1 does not have a throttle valve located in the intake passage 3 so that a substantial amount of intake mixture is introduced into the combustion chamber 4 in the intake stroke but a part of the intake mixture is returned in the compression stroke from the combustion chamber 4 to the intake passage 3 to thereby decrease the effective charge to the combustion chamber 4. It will be understood that the charge of the intake gas to the combustion chamber 4 is therefore determined by the amount of the mixture which is returned to the intake passage 3 and that the closing timing of the intake valve 6 governs the amount of mixture to be returned to the intake passage 3.

Referring again to FIG. 3, the cam shaft 19 is axially biased by a spring 21 and a solenoid actuator 22 is provided for axially displacing the cam shaft 19 against the biasing force of the spring 21. For energizing the solenoid actuator 22, there is provided a valve control circuit 11 which receives the engine speed signal from the engine speed detector 10. The control circuit 11 is also arranged so as to receive a position signal from a position sensor 9 which detects the position of a manually operated engine control member such as a foot pedal adapted to be actuated by a car driver. The control circuit 11 includes an operating circuit 24 which receives the position signal from the position sensor 9 and performs an operation to determine a desired valve closing timing. The output of the operating circuit 24 is then applied through a modifying circuit 25 to a driving circuit 26 which produces output pulses, of which duty ratio is determined in accordance with the position of the engine control member. The output pulses from the driving circuit 26 are applied to the solenoid actuator 22 to energize the same to thereby determine the axial position of the timing cam 7. With this arrangement, it is possible to determine the closing timing of the intake valve 6 and therefore the engine output in accordance with the manually operated engine control member. Where the valve closing timing is advanced as shown by the curve A in FIG. 2, the engine output is increased but, when the valve closing timing is retarded as shown by the curve B, the engine output is decreased.

As shown in FIG. 3, the control circuit 11 further includes a standard engine speed setting circuit 27 which receives the position signal from the position sensor 9 and performs an operation to determine a standard engine speed based on the position signal. The output from the circuit 27 is applied to a differential amplifier 28 which also receives the engine speed signal from the engine speed sensor 10 and produces an output in accordance with the difference between the standard engine speed signal from the circuit 27 and the engine speed signal from the engine speed sensor 10. The output from the differential amplifier 28 is applied to the modifying circuit 25 to modify the signal from the circuit 24 so that the valve closing timing is retarded when the engine speed signal is greater than the standard engine speed signal to thereby stabilize the engine speed and prevent engine overrun.

Figure 4:
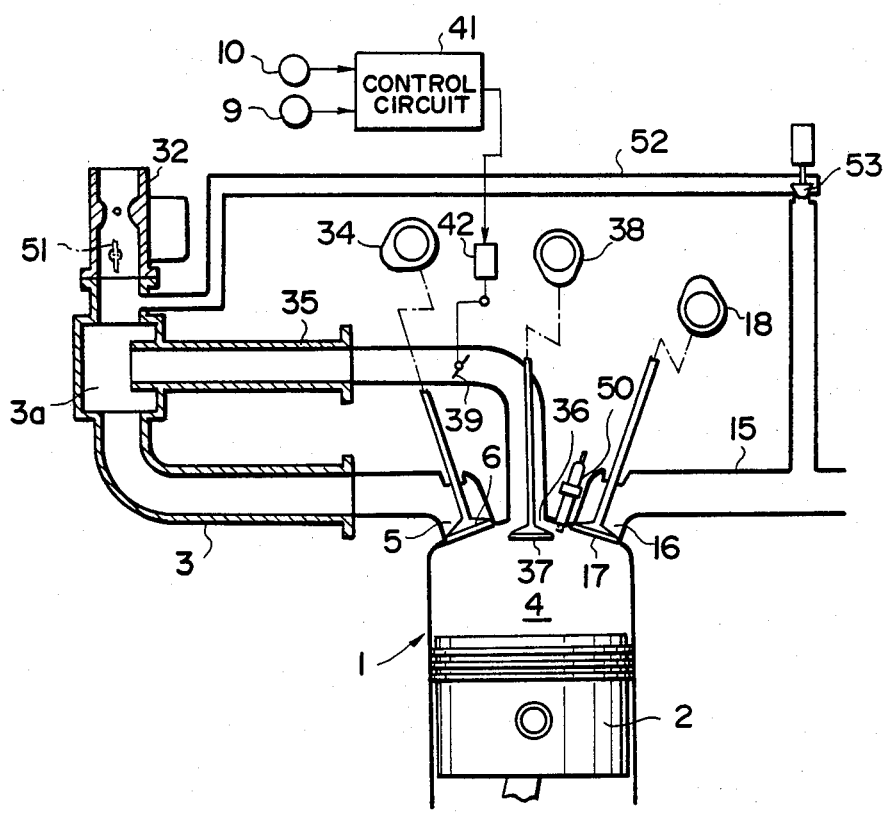
FIG. 4 is a diagrammatical illustration of an engine having an intake system in accordance with another embodiment of the present invention.
Figure 5:
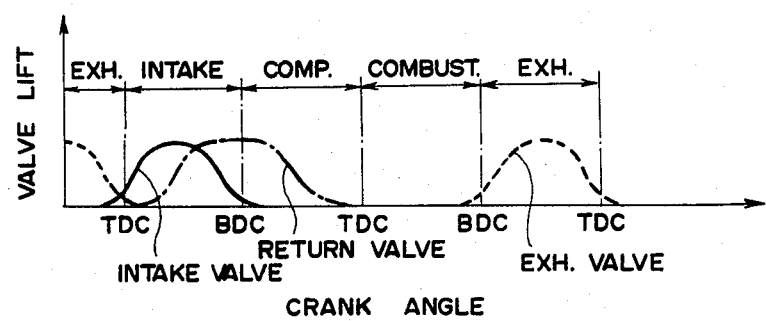
FIG. 5 is a diagram showing valve timings in the embodiment shown in FIG. 4.

FIG. 4 shows another embodiment of the present invention in which corresponding parts are designated by the same reference numerals as in the previous embodiment and details descriptions of these parts are not repeated. In this embodiment, the cylinder 1 is formed with a return port 36 associated with a return valve 37 which is actuated by a cam 38. The return port 36 is connected with a return passage 35 opening to the enlarged chamber 3a of the intake passage 3. The return valve 37 is opened with a timing as shown in FIG. 5 so that a part of the intake mixture in the combustion chamber 4 is returned through the return passage 35 to the intake passage 3. In the return passage 35, there is provided a return flow regulating valve 39 for regulating the amount of intake mixture returned from the combustion chamber 4 so that the engine output can be controlled by the position of the valve 39.

In this embodiment, the intake passage 3 does not have a fuel injecting nozzle but is provided with a carburetor 32 for producing a fuel-air mixture of a desired mixing ratio. It should be noted, however, that the carburetor 32 does not have a throttle valve as in conventional carburetors. The intake valve 6 is adapted to be actuated by a timing cam 34 which functions to open the intake valve 6 at a fixed timing.

Figure 6:
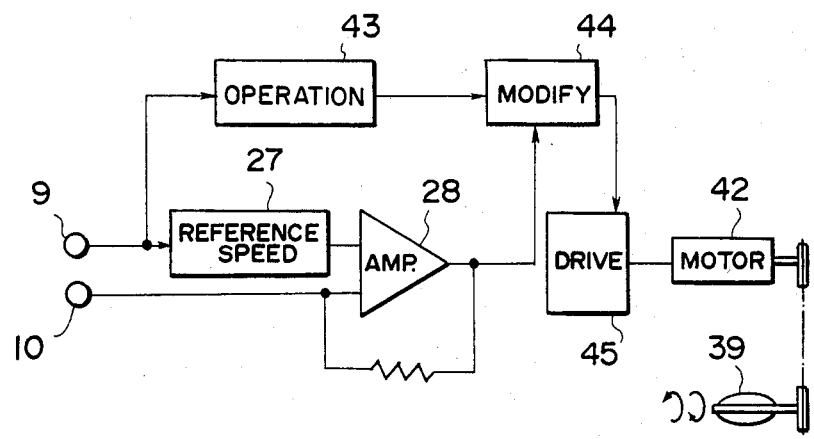
FIG. 6 is a diagram of an engine output restricting system which may be used in the engine shown in FIGS. 1 or 4.

The return flow regulating valve 39 is connected with a valve actuating motor 42 which is adapted to be operated by an electric current supplied from a valve control circuit 41. As shown in FIG. 6, the valve control circuit 41 includes an operation circuit 43 connected with the output of the manual control member position sensor 9 to receive a position signal. The operation circuit 43 performs an operation based on the position signal to produce a valve opening signal in accordance with the position of the manual engine control member. The output of the operation circuit 43 is applied through a modifying circuit 44 to a driving circuit 45 which produces a motor energizing current in accordance with the output of the operation circuit 43. Thus, the motor 42 is operated to move the valve 39 to a position corresponding to the position of the manual engine control member.

In the engine shown in FIG. 4, air-fuel mixture is introduced in the intake stroke to the combustion chamber 4 through the intake passage 3 and possibly through the return passage 35. In the compression stroke, the intake valve 6 is closed but the return valve 37 is maintained in the open position for a certain period as shown in FIG. 5. Therefore, a part of the intake mixture in the combustion chamber 4 is returned through the passage 35 to the enlarged chamber 3a in the intake passage 3 to thereby decrease the charge of the intake mixture. The amount of the mixture returned through the passage 35 is governed by the position of the valve 39. Where the opening of the valve 39 is small, the amount of the returned mixture is small so that a large quantity of mixture is retained in the combustion chamber producing a high engine output. Where the opening of the valve 39 is large, the quantity of the mixture retained in the combustion chamber 4 is small so that the engine output is decreased. Thus, the engine output can be controlled by the manual engine control member.

Referring again to FIG. 6, it will be noted that the control circuit 41 includes a modifying circuit 44 constituted by a standard engine speed setting circuit 27 and a differential amplifier 28 as in the previous embodiment for producing a modifying signal based on the manual control member position signal from the sensor 9 and the actual engine speed signal from the engine speed sensor 10 when the actual engine speed signal is greater than the standard engine speed signal produced by the circuit 27. The modifying signal from the differential amplifier 28 is applied to the modifying circuit 44 to modify the signal from the operation circuit 43 so that the opening of the valve 39 is increased. Thus, the effective charge to the engine is decreased to thereby prevent engine overrun.

Figure 7:
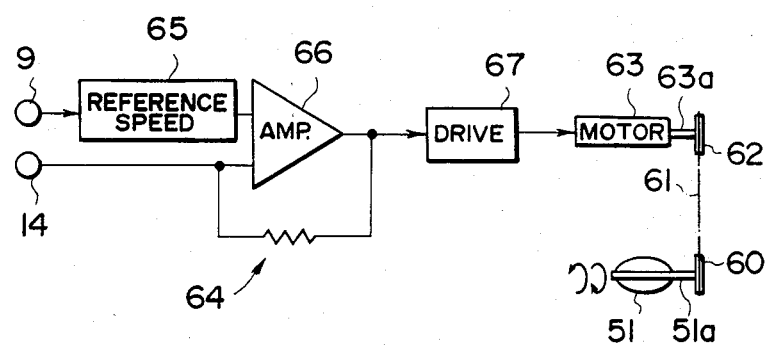
FIGS. 7 through 10 show different types of engine output restricting systems.

In a further embodiment of the present invention shown in FIG. 7, the engine shown in FIG. 1 may be provided with a valve 51 in the intake passage 3 as shown by phantom lines. The valve 51 has a valve shaft 51a provided at one end with a pulley 60 which is connected through a belt 61 with a pulley 62 secured to the output shaft 63a of a valve driving step motor 63. There is provided a control circuit 64 for controlling the operation of step motor 63. The control circuit 64 includes a standard engine speed setting circuit 65 which is connected with the output of the manual engine control member position sensor 9 to receive the position signal. The circuit 65 produces a standard speed signal in accordance with the position signal and the standard speed signal is applied to a differential amplifier 66. The differential amplifier 66 is also supplied with the airflow signal from the airflow sensor 14 to compare the standard engine speed signal with the airflow signal. When the airflow signal is greater than the standard engine speed signal, the amplifier 66 produces a positive voltage signal which is applied to a driving circuit 67. The driving circuit 67 picks up the voltage signal from the differential amplifier 66 with time intervals and at each instance, the driving circuit 67 produces output pulses corresponding in number to the output of the differential amplifier 66 to operate the step motor 63 so as to move the valve 51 toward the closing direction. Thus, the airflow through the intake passage 3 is decreased to thereby decrease the engine output. Therefore, it is possible to prevent engine overrun. When the airflow signal decreases below the standard engine speed signal, the differential amplifier 66 produces a negative voltage signal so that the driving circuit 67 produces output pulses for operating the step motor 63 in the reverse direction. Thus, the valve 51 is actuated toward the opening direction. If the negative voltage signal is continuously produced by the differential amplifier 66, the valve 51 is moved to and maintained at a full open position.

This arrangement can also be applied to the engine shown in FIG. 4 by providing a valve 51 as shown by phantom lines. In this instance, the engine speed signal from the engine speed sensor 10 must be used in the place of the airflow signal.

Figure 8:
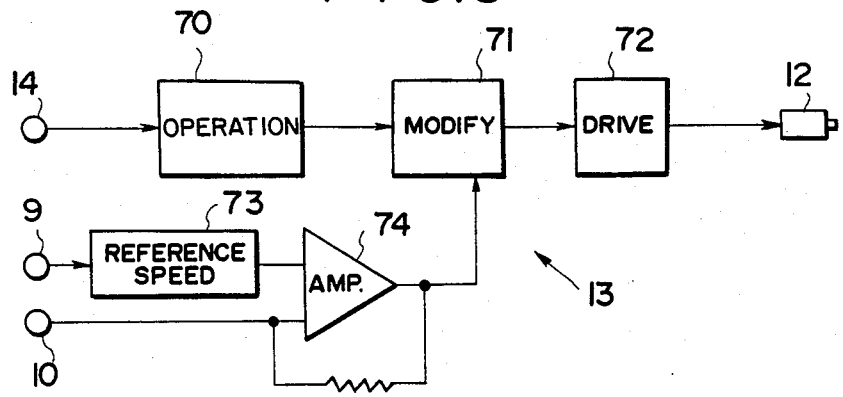

FIG. 8 shows another embodiment which can be applied to a fuel injection type engine such as the one shown in FIG. 1. This type of engine has a fuel injection nozzle 12 located in the intake passage 3 as shown in FIG. 1. The engine also has a fuel control circuit 13 including an operation circuit 70 which receives an airflow signal from the airflow sensor 14. The operation circuit 70 performs an operation based on the airflow signal to determine a desirable amount of fuel to be supplied to the engine and produces a basic fuel signal. The basic fuel signal is applied through a modifying circuit 71 to a driving circuit 72 which produces output pulses for actuating the nozzle 12.

The control circuit 13 further includes a modifying circuit comprised of a standard engine speed setting circuit 73 which is connected with the output of a manual engine control member position sensor 9. The circuit 73 performs an operation based on the position signal from the sensor 9 to determine a standard engine speed and produces a standard speed signal. The standard speed signal is applied to a differential amplifier 74 which also receives an actual engine speed signal from a speed sensor 10. The differential amplifier 74 produces a modifying signal when the actual engine speed signal from the sensor 10 is greater than the standard speed signal from the circuit 73. The modifying signal from the amplifier 74 is applied to the modifying circuit 71 to modify the basic fuel signal from the circuit 70 so that the amount of fuel injected from the nozzle 12 is decreased. Thus, the engine output is decreased and engine overrun is therefore prevented.

Figure 9:
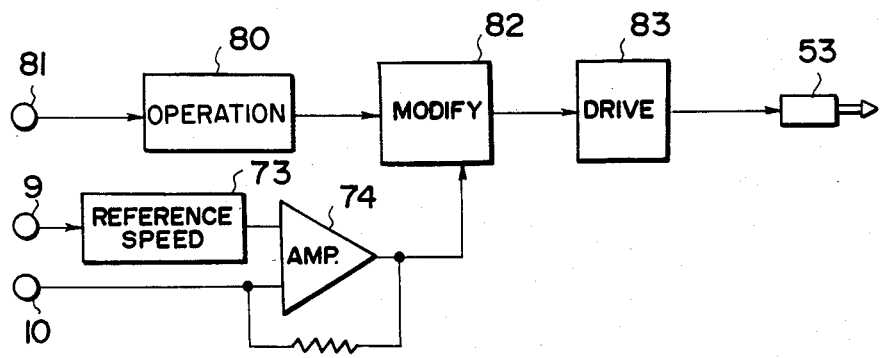

FIG. 9 shows a further embodiment which can be applied to an engine having an exhaust gas recirculation system as shown in FIG. 1 or 4. In FIG. 9, there is shown an exhaust gas recirculation control circuit including an operation circuit 80 receives an engine load signal from a load sensor 81. The load sensor 81 may be in the form of an airflow sensor which detects the airflow to the engine. The operation circuit 80 performs an operation based on the engine load signal to determine a desired amount of exhaust gas returned to the intake system. Thus, the operation circuit 80 produces a gas recirculation signal which is applied through a modifying circuit 82 to a driving circuit 83. The driving circuit 83 produces an output in accordance with the gas recirculation signal for actuating the exhaust gas recirculation control valve 53 to a desired position so as to control the amount of the recirculation gas in accordance with the engine load.

The control circuit further includes a modifying circuit 82 for modifying the gas recirculation signal from the circuit 80 when the actual engine speed is greater than the standard engine speed, which is determined in accordance with the position of a manual engine control member such as a foot pedal. The elements for providing a modifying signal to modifying circuit 82 is the same as that in the embodiment shown in FIG. 8 so that corresponding parts are shown by the same reference numeral as in FIG. 8. The differential amplifier 74 produces a modifying signal when the actual engine speed signal from the sensor 10 is greater than the standard engine speed signal from the reference circuit 73. The modifying signal is applied to the modifying circuit 82 to modify the gas recirculation signal from the operation circuit 80 so that the opening of the recirculation control valve 53 is increased. Thus, the amount of recirculated gas is increased and the engine output is correspondingly decreased to prevent engine overrun.

Figure 10:
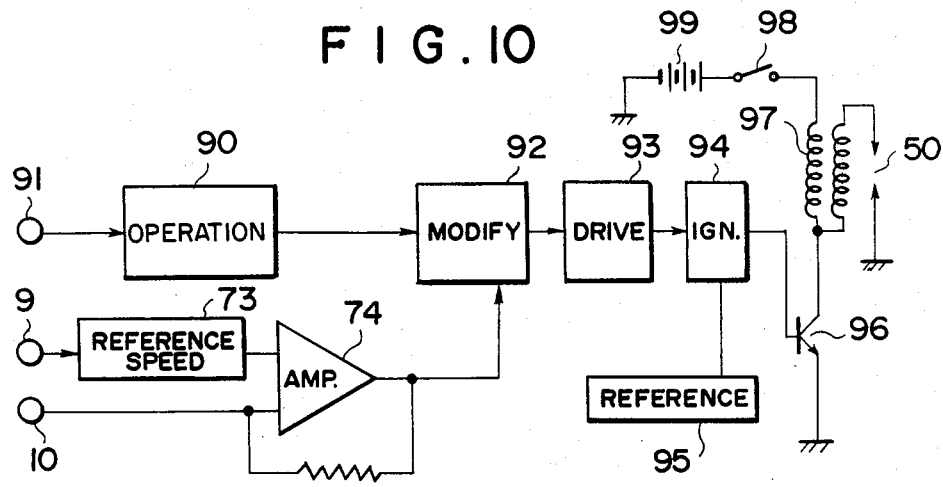

FIG. 10 shows a further embodiment in which the engine ignition timing is retarded when engine overrun is detected. In FIG. 10, there is shown an ignition timing control circuit including an operation circuit 90. The circuit 90 receives an engine load signal from a load sensor 91 and performs an operation based on the load signal to determine a desired ignition timing. The operation circuit 90 thus produces an ignition timing signal which may be a voltage signal the load of which is determined in accordance with the engine load. The ignition timing signal is applied through a modifying circuit 92 to a driving circuit 93. The driving circuit 93 then amplifies the timing signal and applies it to an igniter 94. The igniter 94 is connected with a reference signal generator 95 which produces a reference timing pulse at an appropriate timing in each cycle of engine operation. The igniter 94 is a kind of operation circuit and performs an operation based on the signal from the driving circuit 93 and the reference timing signal from the signal generator 95 to determine a desired ignition timing. The igniter 94 thus produces an output pulse at the desired ignition timing and the output of the igniter 94 is applied to the base of a transistor 96. The transistor 96 is of an NPN type having a collector connected with an ignition coil 97. The ignition coil 97 has a primary coil connected through an ignition switch 98 with a battery 99 and a secondary coil connected with the ignition plug 50. The emitter of the transistor 96 is grounded. It will therefore be understood that when the output pulse of the igniter 94 is applied to the base, the transistor 96 is made conductive so that a high voltage is generated at the secondary side of the ignition coil 97 to thereby produce a spark discharge in the ignition plug 50.

The ignition timing control circuit includes elements for providing a modifying signal to a modifying circuit which the same as the corresponding elements for the modifying circuits in the embodiments shown in FIGS. 8 and 9 so that corresponding parts are designated by the same reference numerals as in the previous embodiment. The output of the differential amplifier 74 is connected with the modifying circuit 92 to modify the ignition timing signal as produced by the operation circuit 90. When the actual engine speed signal from the engine speed sensor 10 is greater than the standard engine speed signal as produced by the setting circuit 73, the differential amplifier 74 produces an output which is applied to the modifying circuit 92 to modify the ignition timing signal so that the ignition timing is retarded. Thus, the engine output is decreased and engine overrun can therefore be prevented.

The invention has thus been shown and described with reference to specific embodiments, however, it should be noted that the invention is in no way limited to the details of the illustrated arrangements but changes and modifications may be made without departing from the appended claims.

We claim:
1. An internal combustion engine comprising: combustion chamber means in which intake and compression strokes are carried out, an intake system having intake passage means for providing a supply of intake gas to said combustion chamber means, charge control means for returning a controlled amount of the intake gas in the combustion chamber means to said intake passage means in the compression stroke to thereby control effective charge to the combustion chamber means, detecting means for detecting at least one factor which is related to engine speed and producing an engine speed signal, manually operated reference setting means for determining a reference speed value, and engine output restricting means for comparing the engine speed signal with said reference value and for providing a signal for restricting engine output when said engine speed signal is greater than said reference value.

2. An engine in accordance with claim 1 in which said engine output restricting means includes means for decreasing the effective charge to the combustion chamber means.

3. An engine in accordance with claim 2 in which said charge decreasing includes means provided in said intake passage means for restricting the supply of the intake gas to the combustion chamber means when the engine speed signal is greater than the reference value.

4. An engine in accordance with claim 2 in which said charge decreasing means includes means for operating said charge control means to increase the amount of intake gas returned to said intake passage means when the engine speed signal is greater than the reference value.

5. An engine accordance with claim 1 in which said engine output restricting means includes means for decreasing the supply of fuel to said combustion chamber means in response to said signal for restricting engine output.

6. An internal combustion engine comprising combustion chamber means, an intake system having intake valve means and intake passage means leading through said intake valve means to said combustion chamber means for providing a supply of intake gas to said combustion chamber means, valve timing control means for governing opening and closing timings of said intake valve means so that said intake valve means is closed at a controlled timing in the compression stroke whereby a controlled amount of the intake gas is returned from said combustion chamber means to said intake passage means in the compression stroke to thereby control effective charge to the combustion chamber means, detecting means for detecting at least one factor which is related to engine speed and producing an engine speed signal, manually operated reference setting means for determining a reference speed value, engine overrun preventing means for comparing said engine speed signal with said reference value and retarding the closing timing of the intake valve means to thereby decrease the effective charge when said engine speed signal is greater than said reference value.

7. An internal combustion engine comprising:
combustion chamber means, intake passage means leading through intake valve means to said combustion chamber means for providing a supply of intake gas to said combustion chamber means, return passage means having one end connected through return valve means with said combustion chamber means and the other end with said intake passage means, first valve actuating means for actuating said intake valve means so that it is opened during an intake stroke, second valve actuating means for actuating said intake valve means so that it is opened during an intake stroke, second valve actuating means for actuating said return valve means so that it is closed later than said intake valve means during a compression stroke whereby a part of the intake gas in the combustion chamber means is returned through the return passage means during the compression stroke to thereby decrease the effective charge of intake gas in the combustion chamber means, control valve means provided in said return passage means to control return flow of intake gas from said combustion chamber means to said intake passage means so as to determine the effective intake gas charge to the combustion chamber means, manually operated reference setting means for determining a reference speed value, detecting means for detecting at least one factor which is related to engine speed and producing an engine speed signal, engine overrun preventing means for comparing said engine speed signal with said reference value and increasing the opening of said control valve means to thereby increase the return flow of intake gas and decrease the effective charge of intake gas in said combustion chamber means when said engine speed is greater than said reference value.

8. An internal combustion engine comprising:
combustion chamber means in which intake and compression strokes are carried out, an intake system having intake passage means for providing a supply of intake gas to said combustion chamber means, charge control means for returning a controlled amount of the intake gas in the combustion chamber means to said intake passage means in the compression stroke to thereby control effective charge to the combustion chamber means, detecting means for detecting at least one factor which is related to engine speed and producing an engine speed signal, manually operated reference setting means for determining a reference speed value, and engine output restricting means for comparing the engine speed signal with said reference value for providing a signal for restricting engine output when said engine speed signal is greater than said reference value; and exhaust gas recirculating means for recirculating exhaust gas to said intake system, said engine output restricting means including means for increasing the amount of exhaust gas recirculated to the intake system to thereby decrease the effective charge to the combustion chamber means.

9. An internal combustion engine comprising:
combustion chamber means in which intake and compression strokes are carried out, an intake system having intake passage means for providing a supply of intake gas to said combustion chamber means, charge control means for returning a controlled amount of the intake gas in the combustion chamber means to said intake passage means in the compression stroke to thereby control effective charge to the combustion chamber means, detecting means for detecting at least one factor which is related to engine speed and producing an engine speed signal, manually operated reference setting means for determining a reference speed value, and engine output restricting means for comparing the engine speed signal with said reference value for providing a signal for rericting engine output when said engine speed signal is greater than said reference value, said engine output restricting means including means for retarding ignition timing to thereby decrease engine output.

* * * * *